US011677967B2

(12) United States Patent
Minoo et al.

(10) Patent No.: US 11,677,967 B2
(45) Date of Patent: Jun. 13, 2023

(54) SCALABLE VIDEO CODING SYSTEM WITH PARAMETER SIGNALING

(71) Applicant: ARRIS Enterprises LLC, Suwanee, GA (US)

(72) Inventors: Koohyar Minoo, San Diego, CA (US); Zhouye Gu, San Diego, CA (US); David M. Baylon, San Diego, CA (US); Ajay Luthra, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/135,500

(22) Filed: Apr. 21, 2016

(65) Prior Publication Data
US 2016/0316215 A1    Oct. 27, 2016

Related U.S. Application Data
(60) Provisional application No. 62/150,476, filed on Apr. 21, 2015.

(51) Int. Cl.
*H04N 19/30* (2014.01)
*H04N 19/17* (2014.01)
(Continued)

(52) U.S. Cl.
CPC .......... *H04N 19/30* (2014.11); *H04N 19/117* (2014.11); *H04N 19/132* (2014.11); *H04N 19/17* (2014.11);
(Continued)

(58) Field of Classification Search
None
See application file for complete search history.

(56) References Cited

U.S. PATENT DOCUMENTS 6,898,313 B2 * 5/2005 Li ............................. G06T 9/00
                                                     382/176
8,731,287 B2 * 5/2014 Su ........................... G06T 5/009
                                                     382/166

FOREIGN PATENT DOCUMENTS

EP      1827024 A1   8/2007
WO   2012/122425 A1   9/2012

OTHER PUBLICATIONS

PCT Search Report & Written Opinion, RE: Application No. PCT/US2016/028722, dated Aug. 8, 2016.
(Continued)

*Primary Examiner* — Mikhail Itskovich
(74) *Attorney, Agent, or Firm* — Chernoff, Vilhauer, McClung & Stenzel, LLP

(57) ABSTRACT

A method is provided for encoding a digital video to provide for improved color mapping. The digital video has values in a first color space, and the method includes performing a color mapping operation on values in each sub-picture to convert the values in the first color space to values in a second, narrower, color space, wherein the color mapping operation is adapted based on the content of each sub-picture, encoding the values in the second color space into a base layer, performing a reverse color mapping operation on decoded values from the base layer in the second color space in each sub-picture to generate a reconstructed reference frame having values in the first color space, encoding values in the first color space into an enhancement layer based at least in part on the reconstructed reference frame, combining the base layer and the enhancement layer into a bitstream, sending the bitstream to a decoder, and sending one or more parameters to the decoder that describe the adaption of the reverse color mapping operation for at least some sub-pictures.

2 Claims, 4 Drawing Sheets

(51) Int. Cl.
*H04N 19/18* (2014.01)
*H04N 19/186* (2014.01)
*H04N 19/132* (2014.01)
*H04N 19/187* (2014.01)
*H04N 19/467* (2014.01)
*H04N 19/117* (2014.01)
*H04N 19/176* (2014.01)
*H04N 19/44* (2014.01)

(52) U.S. Cl.
CPC ......... *H04N 19/176* (2014.11); *H04N 19/186* (2014.11); *H04N 19/187* (2014.11); *H04N 19/44* (2014.11); *H04N 19/467* (2014.11)

(56) References Cited

OTHER PUBLICATIONS

PCT Search Report & Written Opinion, RE: Application No. PCT/US2016/028722, dated Aug. 22, 2016.
Recommendation ITU-T H.265 | International Standard ISO/IEC 23008-2, "High efficiency video coding", version 2, Oct. 2014.

* cited by examiner

SCALABLE VIDEO CODING SYSTEM WITH PARAMETER SIGNALING

CLAIM OF PRIORITY

This application claims priority under 35 U.S.C. § 119(e) from earlier filed U.S. Provisional Application Ser. No. 62/150,476, filed Apr. 21, 2015, which is hereby incorporated by reference.

TECHNICAL FIELD

The present disclosure relates to the field of video encoding and decoding, particularly a method of signaling parameters for reconstructing reference pictures at a decoder in a scalable video coding system.

BACKGROUND

High Dynamic Range (HDR) video and Wide Color Gamut (WCG) video offer greater ranges of luminance and color values than traditional video. For example, traditional video can have a limited luminance and color range, such that details in shadows or highlights can be lost when images are captured, encoded, and/or displayed. In contrast, HDR and/or WCG video can capture a broader range of luminance and color information, allowing the video to appear more natural and closer to real life to the human eye.

Although the extended range of values possible in HDR and/or WCG video can better approximate real life, many monitors cannot yet display such a large range of values. Although access to HDR monitors is improving, there is fragmentation between the reproducibly color ranges on different types of monitors. While it is possible to encode one version of a piece of content for non-HDR monitors and encode another for HDR monitors, encoding and transmitting two different versions of a bitstream can be time-consuming and inefficient.

Some systems have been developed that can include non-HDR and HDR information within different layers of the same bitstream, such that a decoding device can ignore the HDR layer if it is not connected to a monitor that can reproduce the color information in that layer. For example, the Scalable Video Coding (SVC) extension of the MPEG-4 Advanced Video Coding (AVC) coding scheme can handle bitstreams with a base layer of non-HDR information and an enhancement layer with additional information related to HDR values. However, such existing systems generally use the base layer information to predict information in the enhancement layer in a static way that is unrelated to the content of the video.

What is needed is a scalable video coding system where an encoder can apply different operations to different pictures or sub-pictures based on the content of the picture before encoding the enhancement layer, and send parameters to decoders that indicate an appropriate operation to use when decoding the enhancement layer.

SUMMARY

The present disclosure provides a method of encoding a digital video, the method comprising receiving a digital video at a video encoder, the digital video comprising values in a first color space, performing a color mapping operation on values in each sub-picture at the video encoder to convert the values in the first color space to values in a second color space that is narrower than the first color space, wherein the video encoder adapts the color mapping operation based on the content of each sub-picture, encoding the values in the second color space into a base layer, decoding and performing a reverse color mapping operation on the values in the second color space in each sub-picture as decoded from the base layer to generate a reconstructed reference frame having values in the first color space, encoding the values in the first color space into an enhancement layer based at least in part on the reconstructed reference frame, combining the base layer and the enhancement layer into a bitstream, sending the bitstream to a decoder, and sending one or more parameters to the decoder that describe the adaption of the reverse color mapping operation for at least some sub-pictures.

The present disclosure also provides a method of decoding a digital video, the method comprising receiving a bitstream comprising a base layer and an enhancement layer at a video decoder, receiving one or more parameters associated with at least some sub-pictures, decoding base layer values in a first color space from the base layer, performing a reverse color mapping operation on the base layer values within each sub-picture, to generate a reconstructed reference picture having values in a second color space that is wider than the first color space, wherein the video decoder adapts the reverse color mapping operation for each sub-picture based on received parameters associated with that sub-picture, and decoding enhancement layer values in the second color space from the enhancement layer using prediction based on the reconstructed reference picture.

The present disclosure also provides a video encoder comprising a data transmission interface configured to receive a digital video comprising full resolution values, and a processor configured to perform a downsampling operation to convert the full resolution values into downsampled values, encode the downsampled values into a base layer, decode the base layer into reconstructed downsampled values, perform an upsampling operation on the reconstructed downsampled values to generate a reconstructed full resolution reference frame for a particular coding level, encode the full resolution values into an enhancement layer based at least in part on the reconstructed full resolution reference frame, and combine the base layer and the enhancement layer into a bitstream, wherein the data transmission interface is further configured to send the bitstream to a decoder, and send one or more parameters to the decoder that describe the upsampling operation for the particular coding level.

The present disclosure also provides a video decoder comprising a data transmission interface configured to receive a bitstream comprising a base layer and an enhancement layer, and one or more parameters associated with an upsampling operation for a particular coding level, and a processor configured to derive the upsampling operation for the particular coding level from the one or more parameters, decode the base layer into values at a downsampled resolution, perform the upsampling operation to generate a reconstructed reference picture at a full resolution, and decode a picture in the enhancement layer using the reconstructed reference picture.

BRIEF DESCRIPTION OF THE DRAWINGS

Further details of the present invention are explained with the help of the attached drawings in which.

DETAILED DESCRIPTION

Figure 1:
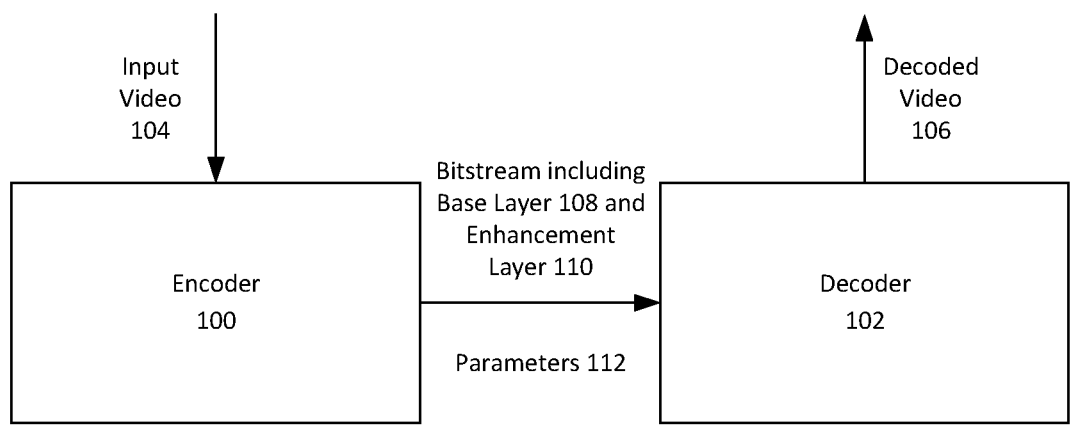
FIG. 1 depicts an embodiment of a scalable video coding system comprising an encoder and a decoder.

FIG. 1 depicts an embodiment of a scalable video coding system comprising an encoder 100 and a decoder 102. An encoder 100 can comprise processors, memory, circuits, and/or other hardware and software elements configured to encode, transcode, and/or compress input video 104 into a coded bitstream. The encoder 100 can be configured to generate the coded bitstream according to a video coding format and/or compression scheme, such as HEVC (High Efficiency Video Coding), H.264/MPEG-4 AVC (Advanced Video Coding), or MPEG-2. By way of a non-limiting example, in some embodiments the encoder 100 can be a Main 10 HEVC encoder.

The encoder 100 can receive an input video 104 from a source, such as over a network or via local data storage from a broadcaster, content provider, or any other source. The encoder 100 can encode the input video 104 into the coded bitstream. The coded bitstream can be transmitted to decoders 102 over the internet, over a digital cable television connection such as Quadrature Amplitude Modulation (QAM), or over any other digital transmission mechanism.

A decoder 102 can comprise processors, memory, circuits, and/or other hardware and software elements configured to decode, transcode, and/or decompress a coded bitstream into decoded video 106. The decoder 102 can be configured to decode the coded bitstream according to a video coding format and/or compression scheme, such as HEVC, H.264/MPEG-4 AVC, or MPEG-2. By way of a non-limiting example, in some embodiments the decoder 102 can be a Main 10 HEVC decoder. The decoded video 106 can be output to a display device for playback, such as playback on a television, monitor, or other display.

In some embodiments, the encoder 100 and/or decoder 102 can be a dedicated hardware devices. In other embodiments the encoder 100 and/or decoder 102 can be, or use, software programs running on other hardware such as servers, computers, or video processing devices. By way of a non-limiting example, an encoder 100 can be a video encoder operated by a video service provider, while the decoder 102 can be part of a set top box connected to a television, such as a cable box.

The input video 104 can comprise a sequence of pictures, also referred to as frames. In some embodiments, colors in the pictures can be described digitally using one or more values according to a color space or color model. By way of a non-limiting example, colors in a picture can be indicated using an RGB color model in which the colors are described through a combination of values in a red channel, a green channel, and a blue channel. By way of another non-limiting example, many video coding formats and/or compression schemes use a Y'CbCr color space when encoding and decoding video. In the Y'CbCr color space, Y' is a luma component while Cb and Cr are chroma components that indicate blue-difference and red-difference components.

In some embodiments or situations, the input video 104 can be an HDR input video 104. An HDR input video 104 can have one or more sequences with luminance and/or color values described in a high dynamic range (HDR) and/or on a wide color gamut (WCG). By way of a non-limiting example, a video with a high dynamic range can have luminance values indicated on a scale with a wider range of possible values than a non-HDR video, and a video using a wide color gamut can have its colors expressed on a color model with a wider range of possible values in at least some channels than a non-WCG video. As such, an HDR input video 104 can have a broader range of luminance and/or chroma values than standard or non-HDR videos.

In some embodiments, the HDR input video 104 can have its colors indicated with RGB values in a high bit depth format, relative to non-HDR formats that express color values using lower bit depths such as 8 or 10 bits per color channel. By way of a non-limiting example, an HDR input video 104 can be in an EXR file format with RGB color values expressed in a linear light RGB domain using a 16 bit floating point value for each color channel.

As shown in FIG. 1, the coded bitstream generated by encoder 100 and transmitted to the decoder 102 can comprise a base layer 108 and an enhancement layer 110. By way of a non-limiting example, scalable video coding schemes such as HEVC and AVC with a Scalable Video Coding (SVC) extension can encode and decode bitstreams comprising a base layer 108 and an enhancement layer 110. The base layer 108 and the enhancement layer 110 can include information about an HDR input video 104 at different quality levels, different color spaces, different spatial resolutions, and/or different bit depths. By way of a non-limiting example, the enhancement layer 110 can be encoded with a wider color gamut, higher bit-depth, and/or a higher spatial resolution than the base layer 108.

In some embodiments, the base layer 108 can include information about non-HDR and/or non-WCG components of an HDR input video 104, while the enhancement layer 110 can include additional information about extended ranges of color values not described by the base layer 108. By way of a non-limiting example, the base layer 108 can be encoded to include color values from the HDR input video 104 that are within a range of colors that can be displayed on a standard non-HDR monitor, while the enhancement layer 110 can be encoded with information about additional color values that are beyond the base layer's range, such that HDR monitors configured to display a wider range of color values can use the information in the enhancement layer 110 to display an HDR decoded video 106. As such, the base layer 108 can include a subset of the full range of colors described in the original HDR input video 104, while the enhancement layer 110 can describe the full range of colors from the original HDR input video 104 in combination with the base layer 108.

Figure 2:
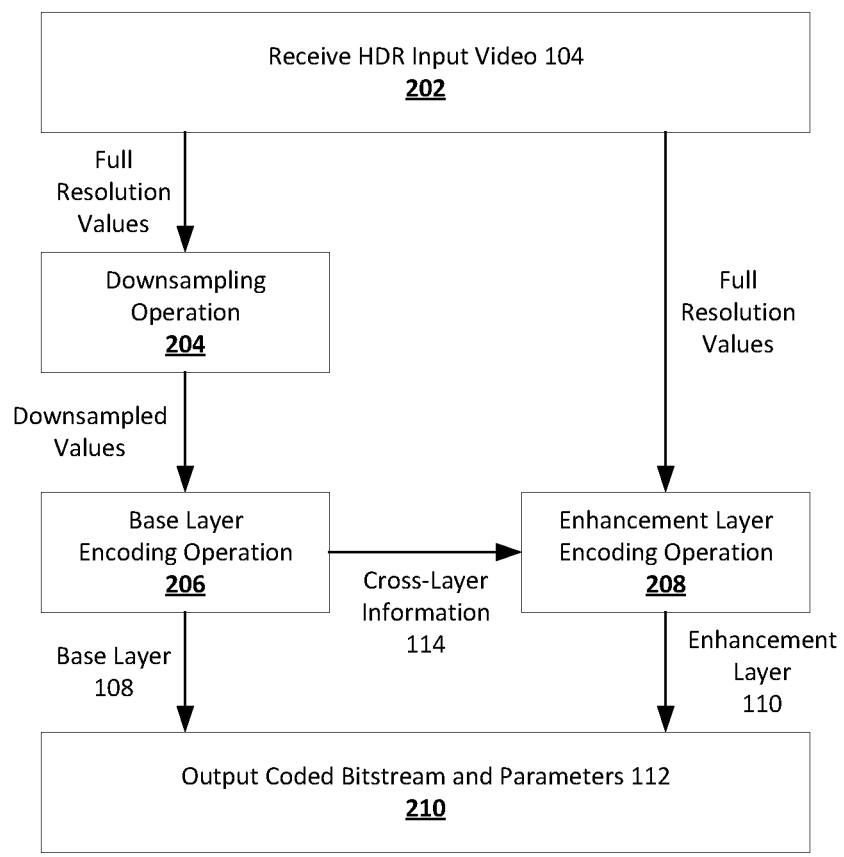
FIG. 2 depicts a flowchart of a process for encoding an HDR input video using a scalable video coding system.

FIG. 2 depicts a flowchart of a process for encoding an HDR input video 104 using a scalable video coding system.

At step 202, the encoder 100 can receive an HDR input video 104 from a source. The HDR input video 104 can have full resolution color values, such as values in an HDR and/or WCG range, in a particular color space, at a high bit depth, at a high spatial resolution, and/or in any other format denoted as full resolution.

At step 204, the encoder 102 can perform one or more downsampling operations on color values from the HDR input video 104, to convert them from full resolution to a downsampled resolution.

One downsampling operation can be a color space conversion of the values into a non-HDR color space. In some embodiments, color space conversion can take a triplet sample, such as red, green, and blue components in an RGB color domain, and map it to a corresponding sample at the same spatial location in another color space. By way of a non-limiting example, when the HDR input video 104 has color values in a wide color gamut space, such as the DCI-P3 or BT.2020 color space, the encoder 100 can convert the color values to a narrower color space, such as the BT.709 color space.

Another downsampling operation can be reducing the bit depth of the full resolution values. By way of a non-limiting example, in some embodiments or situations the full resolution values can be expressed with 16-bit floating point values, and a downsampling operation can convert them to a format with a lower bit depth, such as 8 or 10-bit values.

Still another downsampling operation can be to reduce the spatial resolution of the full resolution values. By way of a non-limiting example, the full resolution values can describe pictures in a 4K resolution, and the downsampling operation can generate values for lower resolution versions of those pictures, such as a 1080p resolution.

At step 206, the encoder 100 can encode pictures described by the downsampled values into the base layer 108. In some embodiments, the pixels of each picture can be broken into sub-pictures, such as processing windows, slices, macroblocks in AVC, or coding tree units (CTUs) in HEVC. The encoder 100 can encode each individual picture and/or sub-picture using intra-prediction and/or inter-prediction. Coding with intra-prediction uses spatial prediction based on other similar sections of the same picture or sub-picture, while coding with inter-prediction uses temporal prediction to encode motion vectors that point to similar sections of another picture or sub-picture, such as a preceding or subsequent picture in the input video 104. As such, coding of some pictures or sub-pictures can be at least partially dependent on other reference pictures in the same group of pictures (GOP).

At step 208, the encoder 100 can encode pictures described by the HDR input video's original full resolution values into the enhancement layer 110. The encoder 100 can encode the enhancement layer using, in part, cross-layer information 114 indicating how to reconstruct or predict full resolution values from the downsampled values of the base layer 108. The cross-layer information 114 can comprise reference pictures decoded and upsampled from the base layer 108, and/or parameters 112 of a function such as a color mapping operation, a filter operation, and/or a coding transfer function that can predict reconstructed full resolution values for the enhancement layer 110 from downsampled values decoded from the base layer 108.

At step 210, the encoder 100 can combine the base layer 108 and enhancement layer 110 into a bitstream that can be transmitted to a decoder 102. The decoder 102 can decode the bitstream as described below with respect to FIG. 5.

Figure 3:
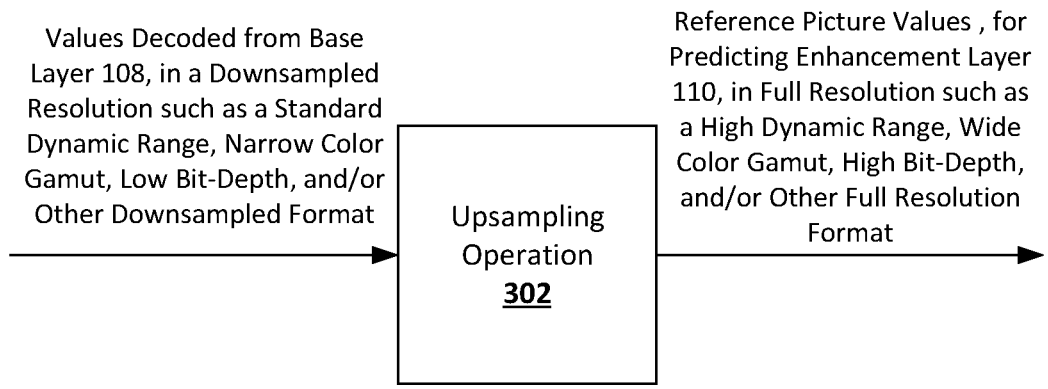
FIG. 3 depicts a first exemplary process for generating cross-layer information from a base layer at an encoder.

FIG. 3 depicts a non-limiting example of a process for generating cross-layer information 114 from a base layer 108 at the encoder 100. After the base layer 108 is encoded at step 206, the encoder 100 can perform a decoding operation on the base layer 108 to obtain downsampled values. The encoder 100 can then perform one or more upsampling operations 302 on the downsampled values to reconstruct a reference picture described by full resolution values. Upsampling operations 302 can include a reverse color mapping operation, increasing the bit depth, and/or increasing the spatial resolution. The upsampling operations 302 can be selected or adjusted at the encoder 100, such that reconstructed full resolution values approximate the original full resolution values from the HDR input video 104 and an error metric describing differences between the reconstructed and original full resolution values, such as a mean-squared error (MSE) or peak signal to noise ratio (PSNR), is minimized. As will be described below with respect to FIG. 5, the decoder 102 can also perform a substantially similar decoding operation on the base layer 108 and one or more substantially similar upsampling operations 302 during its decoding process.

The reconstructed reference pictures generated with the upsampling operations 302 can be used during step 208 when encoding full resolution values from the HDR input video 104 into the enhancement layer. By way of a non-limiting example, pictures in the HDR input video 104 can be spatially predicted for the enhancement layer 110 based on full resolution reference pictures reconstructed from the base layer 108.

Figure 4:
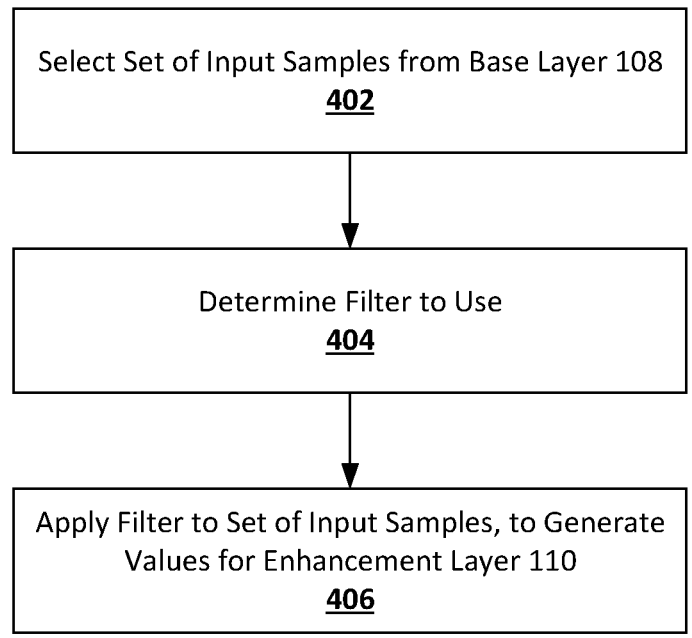
FIG. 4 depicts a second exemplary process for generating cross-layer information from a base layer.

FIG. 4 depicts another non-limiting example of a process for generating cross-layer information 114 from a base layer 108. In this example, cross-layer information can describe a filter through which base layer 108 values can be converted into full resolution values for predicting the enhancement layer 110.

After the base layer 108 is encoded at step 206, the encoder 100 can select a set of input samples from the base layer 108, at the downsampled resolution. By way of a non-limiting example, the input samples can be a two-dimensional subset of samples taken at the downsampled resolution.

At step 404, the encoder 100 can select an appropriate filter that can convert the input samples at the downsampled resolution to reconstructed full resolution values. By way of a non-limiting example, when the set of input samples is a set of two dimensional samples at the downsampled resolution, the encoder 100 can select a two dimensional filter match that corresponds to characteristics of the set of two dimensional samples.

At step 406, the selected filter can be applied to the set of input samples, to produce reconstructed values at full resolution.

By way of a non-limiting example, when filtering is separable, a filter h[n; m] can be applied along rows and columns of the set of input samples at the downsampled resolution to produce an output values y[m] at full resolution for each output index m. In some embodiments, the encoder 100 can have a set of M filters, and at each output index m a particular filter h from the set can be chosen based on can be chosen from the set of M filters, as defined by h[n; m mod M]. In some embodiments filters h[n; p], where p=m mod M, can correspond to filters with M different phase offsets, such as where p=0, 1, . . . , M−1 when the phase offset is p/M.

In still other embodiments, the cross-layer information 114 can describe transfer function mappings through which enhancement layer 110 values can be predicted from base layer 108 values. By way of non-limiting examples, transfer function mappings can be mappings between downsampled values and full resolution values according to a gamma function, a perceptual quantizer (PQ) function, or a piecewise function such as a piecewise linear function.

Figure 5:
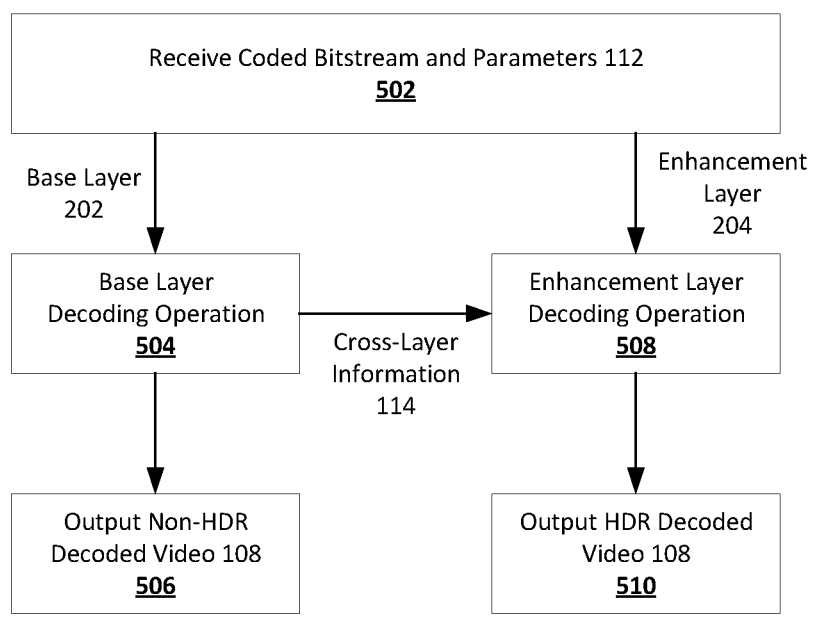
FIG. 5 depicts a flowchart of a process for decoding an HDR decoded video from a bitstream using a scalable video coding system.

FIG. 5 depicts a flowchart of a process for decoding an HDR decoded video 106 from a bitstream using a scalable video coding system.

At step 502, the decoder 102 can receive a bitstream generated by an encoder 100. The bitstream can comprise a base layer 108 describing values at a downsampled resolution, and an enhancement layer 110 that in combination with the base layer 108 can describe values in a full resolution, such as values in an HDR and/or WCG range, in a particular color space, at a high bit depth, at a high spatial resolution, and/or in any other format denoted as full resolution.

At step 502, the decoder 102 can decode the base layer 108 to obtain downsampled values. If the decoder 102 is outputting video to a monitor or other device that only needs the video in the downsampled resolution, it can ignore the enhancement layer 110 and output a non-HDR decoded video 106 using those downsampled values at step 506.

However, if the decoder 102 is outputting video to a monitor or other device that can playback or use values in the full resolution, the decoder 102 can use cross-layer information 114 from the base layer 108 to also decode the enhancement layer 110 at step 508. Reconstructed full resolution values decoded from the enhancement layer 110 can be output as HDR decoded video 106 at step 510.

By way of non-limiting examples, to decode inter-predicted pictures in the enhancement layer 110, the decoder 102 can decode downsampled values from the base layer 108 at step 504, then perform one or more upsampling operations 302 as described above to generate reconstructed reference pictures at the full resolution. The full resolution reconstructed reference pictures can be used as cross-layer information 114 during step 508 to decode inter-predicted pictures in the enhancement layer 110.

As described above, full resolution values in the enhancement layer 110 can be encoded and decoded at least in part based on predictions of full resolution values generated from downsampled values in the base layer 108. Accordingly, when the base layer 108 and enhancement layer 110 are combined into a bitstream and sent to a decoder, the encoder 100 can also send one or more parameters 112 that can indicate to the decoder 102 how to upsample values from the base layer 108 into reference pictures at the full resolution, such that they can be used when decoding spatially predicted pictures in the enhancement layer 110. By way of non-limiting examples, the parameters 112 can be values sent from the encoder 100 that a decoder 102 can use to derive an upsampling operation such as a color mapping operation, a filter, or a transfer function. The decoder 102 can thus determine an appropriate upsampling operation for sets of downsampled values from the base layer 108 to convert values from the base layer 108 into full resolution values that can reconstruct reference pictures the decoder 102 can use when decoding the enhancement layer 110.

The encoder 100 can send a set of one or more parameters 112 describing upsampling operations 302 between for different positions within the same picture, for a single picture, and/or for one or more sequences of pictures, such as GOPs. By way of a non-limiting example, the parameters 112 can be different color mapping operations to use for different regions within the same frame, such as sub-pictures including processing windows, slices, macroblocks, or CTUs. The decoder 102 can use the parameters 112 to derive an appropriate upsampling operation for a sub-picture, picture, or supra-picture sequence.

In some embodiments, the encoder 100 can send parameters 112 at a sub-picture, picture, or supra-picture coding level such that a decoder 102 can derive an appropriate upsampling operation 302 that can assist in reconstructing a reference picture at full resolution for that coding level. By way of a non-limiting example, when the decoder 102 receives parameters 112 through which it can derive a color mapping operation for a reference frame, the decoder 102 can keep the reference frame and the parameters for the that reference frame at one or more resolutions, such as 4×4, 8×8, or 16×16. As such, it can re-use the reference frame and/or received parameters as appropriate when decoding pictures from the enhancement layer 110 that were predicted based on that reference frame. In some embodiments, the decoder 102 can adjust received parameters 112 based on the desired spatial resolution, such as 2×2×2, 1×1×1, or 8×2×2 color mapping parameters.

In some embodiments, when the decoder 102 receives parameters relevant to some spatial locations within a frame, it can predict parameters 112 for other spatial locations based on spatial prediction. By way of a non-limiting example, the decoder 102 can predict parameters 112 for a particular location based on parameters 112 received from the encoder 100 for neighboring locations.

In some embodiments, when the decoder 102 decodes the enhancement layer 110 using temporal prediction, a picture or sub-picture can be decoded based on parameters 112 received for collated pixels of a reference picture.

In some embodiments, when parameters 112 are received for a particular reference picture within a GOP, those parameters 112 can be used for other pictures within the GOP and/or other GOPs, until new parameters 112 are received.

In some embodiments or situations, the encoder 100 can send parameters 112 to the decoder 102 on a supra-picture level. In these embodiments or situations, the upsampling operation 302 described by the parameters 112 can be applicable to all the pictures in a given sequence, such as a GOP. In some embodiments, the encoder 100 can send the parameters 112 to the decoder 102 on a supra-picture level using supplemental enhancement information (SEI) message. In other embodiments, the encoder 100 can send the parameters 112 to the decoder 102 on a supra-picture level using video usability information (VUI) or other information within a Sequence Parameter Set (SPS) associated with the GOP. In some embodiments, the decoder 102 can use the most recently received parameters 112 until new parameters 112 are received, at which point it can derive a new upsampling operation 302 from the newly received parameters 112. By way of a non-limiting example, parameters 112 can initially be set in an SPS, and then be updated on a per-GOP basis as the characteristics of the input video 104 changes.

In some embodiments or situations, the encoder 100 can send parameters 112 to the decoder 102 on a picture level. In these embodiments or situations, the upsampling operation 302 described by the parameters 112 can be applicable to full pictures. In some embodiments, the encoder 100 can send the parameters 112 to the decoder 102 on a picture level within a Picture Parameter Set (PPS) associated with a picture.

In some embodiments, such as when the pictures are P or B pictures that were encoded with reference to one or more reference pictures, the decoder 102 can receive and maintain parameters 112 for the reference pictures, as well as parameters 112 specific to individual temporally encoded pictures. As such, when the decoder 102 previously generated a reference picture with full resolution values using a first set of parameters 112, and the decoder 102 receives different parameters 112 for decoding a P or B picture encoded with reference to the reference picture, the decoder 102 can first reverse an upsampling operation 302 it previously performed on the reference picture using the parameters 112 received for the reference picture to return it to downsampled values. The decoder 102 can then perform a new upsampling operation 302 on the reference picture's downsampled values using a second set of parameters 112 received for the current picture, to re-map the reference picture in full resolution values using the current picture's parameters 112. The re-mapped reference picture can then be used in decoding the current picture and predicting its values in the enhancement layer 110. In some embodiments, the decoder 102 can re-map reference pictures according to new parameters 112 associated with a current picture if the new parameters 112 differ from old parameters 112 associated with the reference picture. In alternate embodiments, the decoder 102 can re-map reference pictures as described above if re-mapping is indicated in a flag or parameter received from the encoder 100.

In some embodiments or situations, the encoder 100 can send parameters 112 to the decoder 102 on a sub-picture level. In these embodiments or situations, the upsampling operation 302 described by the parameters 112 can be applicable to sub-pictures within a picture, such as processing windows, slices, macroblocks, or CTUs.

In some embodiments, the decoder 102 can receive and maintain parameters 112 for a current sub-picture and all reference pictures or sub-pictures, such as pixel blocks of size 4×4 or 8×8. As such, when decoding a sub-picture that was coded with reference to one or more reference pictures, the decoder 102 can first reverse previous upsampling operations 302 performed on reference pixels using parameters 112 previously received for the reference pixels to return it to downsampled values. The decoder 102 can then apply a new upsampling operation 302 on the reference pixels using new parameters associated with the current sub-picture to re-map the reference pixels into full resolution values, such that the decoder 102 can decode the current sub-picture's enhancement layer values using the re-mapped sub-pixels. In some embodiments, the decoder 102 can re-map reference pixels according to new parameters 112 associated with a current sub-picture if the new parameters 112 differ from old parameters 112 associated with the reference pixels. In alternate embodiments, the decoder 102 can re-map reference pixels as described above if re-mapping is indicated in a flag or parameter received from the encoder 100.

Although the present invention has been described above with particularity, this was merely to teach one of ordinary skill in the art how to make and use the invention. Many additional modifications will fall within the scope of the invention, as that scope is defined by the following claims.

The invention claimed is:

1. A method of decoding a digital video signal, comprising:
    receiving in a video decoder a bitstream containing the digital video signal, the bitstream comprising a base layer and an enhancement layer;
    receiving one or more sets of parameters, each associated with a respective one of a plurality of sub-pictures in the bitstream, each of the subpictures having a different spatial position within a picture relative to other said subpictures;
    decoding base layer values in a first color space in said base layer;
    within each of the sub-pictures, performing a reverse color mapping operation on said base layer values within each respective subpicture using the set of parameters respectively associated with the respective sub-picture, to generate a reconstructed reference picture having values in a second color space wider than said first color space, wherein said reverse color mapping operation for each respective subpicture maps a color in the first color space of the base layer to a color in the second color space of the base layer, wherein the mapping of a color in the first color space to a color in the second color space differs between at least two of the plurality of sub-pictures; and
    decoding enhancement layer values in said second color space in said enhancement layer using prediction based on said reconstructed reference picture and providing the decoder output to a video player; wherein
    the decoding of the enhancement layer comprises decoding a current sub-picture with reference to the re-mapped sub-pictures output.

2. The method of claim 1, further comprising predicting parameters for sub-pictures for which parameters were not received, based on received parameters associated with neighboring sub-pictures.

* * * * *